N. S. KINYON.
Churn.
No. 61,436. Patented Jan. 22, 1867.
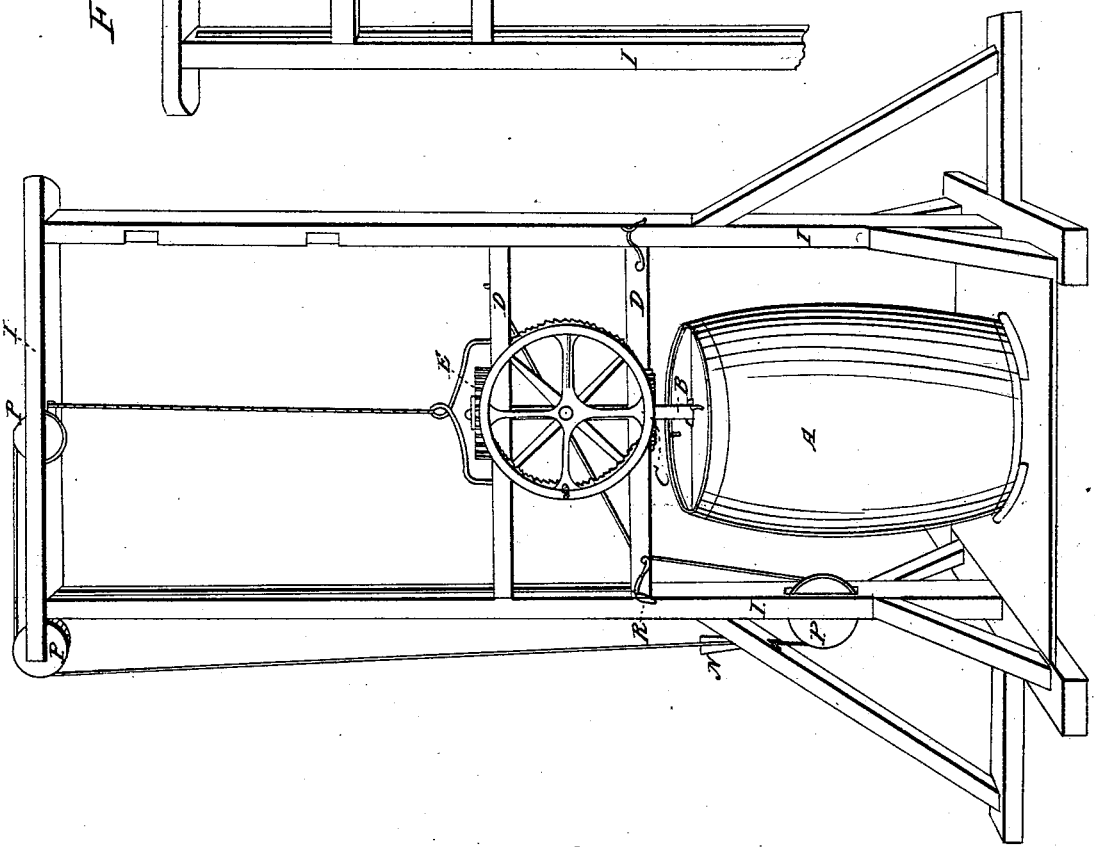

United States Patent Office.

NORMAN S. KINYON, OF CHENANGO FORKS, NEW YORK.

Letters Patent No. 61,436, dated January 22, 1867.

---

IMPROVEMENT IN CHURNS.

---

*The Schedule referred to in these Letters Patent and making part of the same.*

---

TO ALL WHOM IT MAY CONCERN:

Be it known that I, NORMAN S. KINYON, of Chenango Forks, in the county of Broome, in the State of New York, have invented a new and useful Improvement on Churns for churning butter; and I do hereby declare that the following is a full, clear, and exact description of the construction and operation of the same, reference being had to the annexed drawings making a part of this specification, in which—

Figure 1 is a perspective view.

Figure 2 represents the gearing and the arrangements inside of the churn.

Like letters represent like parts in each figure.

This invention consists in the combination of a series of revolving concentric dashers, with their proper frame and gear-work so arranged that said dashers revolve in different directions, thus causing the cream to impinge upon the blade of the reversed dashers with a force proportionate to the velocity of the driving-wheel. It also consists in attaching angular blades to a collar on the lower end of the vertical shaft, for the purpose of forcing the cream from the bottom of the vessel to the surface, thus producing more violent agitation, and facilitating the rupture of the globules. Said blades are also designed to collect or "gather" the butter after the operation of churning, which is accomplished by raising the dashers from the vessel by means of a cord and pulleys attached to the frame. The frame of my improvement may be constructed of wood, or cast iron or other suitable metallic substance. The vertical shaft B works in the movable cross-head frame D. On the upper end of said shaft I attach a pinion, E, which takes into the teeth of the upper part of the driving crank wheel C. I then attach another pinion of the same size on the socket E, to which the upper end of the outer dasher blades are secured; this pinion takes into the lower part of said driving-wheel, so that when the crank is turned the two pinions and dashers move in opposite directions. At the lower end of the shaft B, I attach four angular blades, $s\ s$; these blades are first attached to a collar, and this collar is secured to the shaft, answering the purpose of a shoulder for the hub H of the outer dasher G to work upon, and to keep it in position as it revolves around the shaft. The driving-wheel C is so arranged that it can be used with more or less leverage; or a pulley can be attached if found necessary. The frame is so arranged that I the churn A will set firmly in its place, and the cross-head frame D, with the dashers, can be raised out of the vessel by means of the cord O and pulleys P P P. When the dashers are in their position, the cross-head frame is secured in its place by means of the hooks R R. For the purpose of holding the dashers in any position above the churn, I insert the pin N into the hole in the frame through which the cord O passes. When I use my improvement, after filling the churn with the proper quantity of cream, I put on the cover, secure the cross-head or gearing-frame D by means of the hooks R R; I then apply the power to the driving-wheel C, giving it about fifty revolutions in a minute; the concentric dashers each having four blades operating in different directions, with the angular blades $s\ s$, on the lower end of the shaft, forcing the cream upward, and, passing the dashers on its way to the surface, produce a violent agitation, and soon rupture the globules. The operation of churning seldom exceeds fifteen minutes, producing a much better article than by the ordinary method. I then remove the cover from the churn, loosen the pin N, and raise the dashers until they are clear from the surface of the milk, leaving the angular blades $s\ s$ still partially submerged. I then turn the wheel slowly, and by this means "gather" every particle of the butter in mass. After removing the butter and milk from the churn, I drop the dashers into their position in the churn, pour in a quantity of hot water, and give the full motion to the driving-wheel; this thoroughly cleanses the whole apparatus, preparatory to another operation. I am aware that there have been other devices similar in some respects to my improvement; some of them accomplish the reversed motion of the two dashers by means of two shafts, while others confine themselves to one, but using a different-shaped dasher blade. I therefore disclaim all such, and confine myself only to those features in my improvement that are novel.

What I claim, and desire to secure by Letters Patent, is—

The combination, construction, and arrangement of the dasher blades or floats with the angular blades $s\ s$, on the lower end of the shaft B, substantially as described and for the purpose set forth.

NORMAN S. KINYON.

Witnesses:
S. H. McCALL,
M. A. NEWMAN.